J. LACY.
Horse Rake.
No. 47,736.
Patented May 16, 1865.
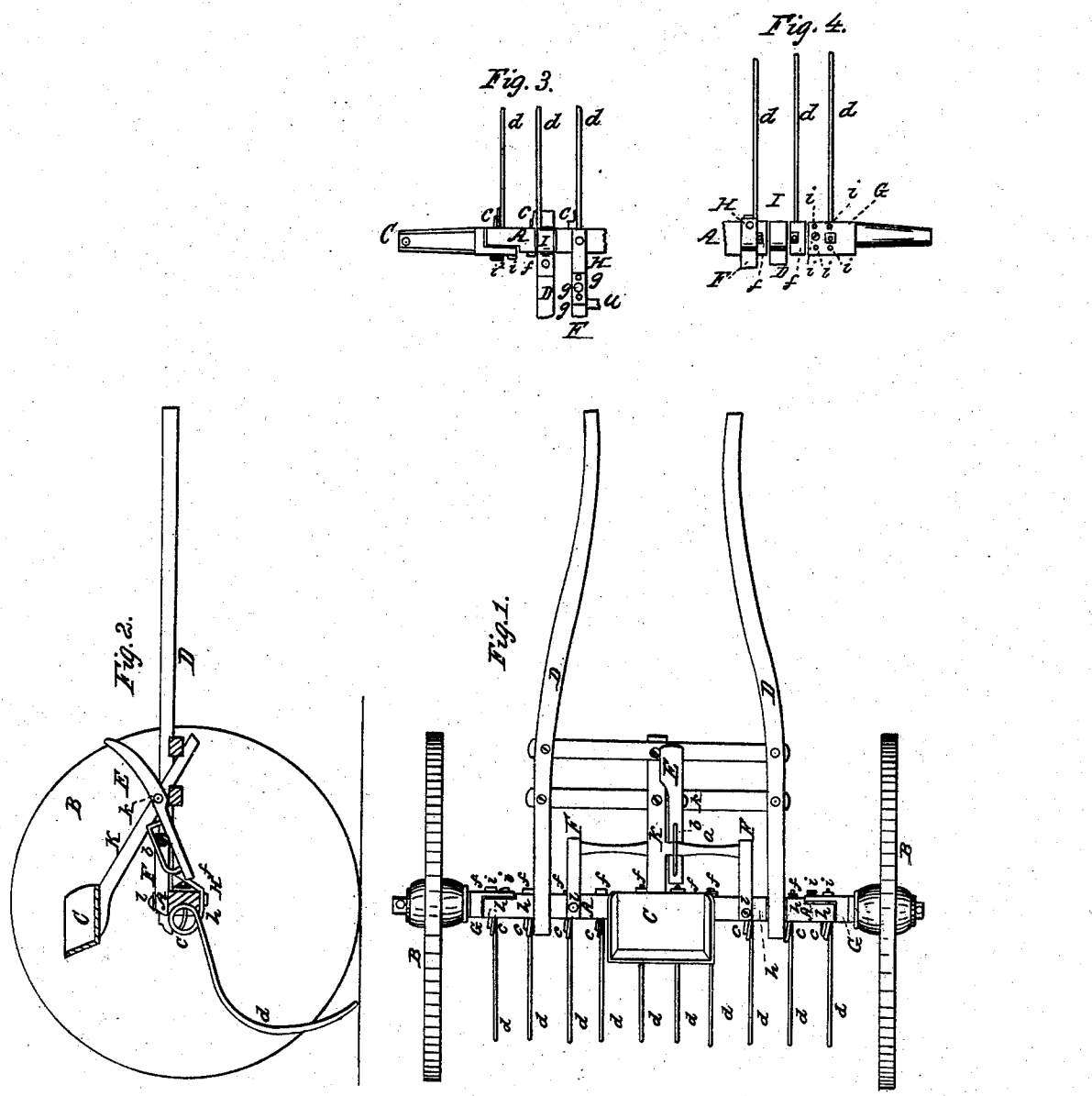

UNITED STATES PATENT OFFICE.

JOHN LACEY, OF CHICAGO, ILLINOIS.

IMPROVEMENT IN HORSE-RAKES.

Specification forming part of Letters Patent No. 47,736, dated May 16, 1865.

*To all whom it may concern:*

Be it known that I, JOHN LACEY, of the city of Chicago, county of Cook, and State of Illinois, have invented certain new and useful Improvements in Horse-Rakes; and I do hereby declare that the following is a full, clear, and exact description of the same, reference being had to the accompanying drawings, making part of this specification, in which—

Figure 1 is a top view. Fig. 2 is a vertical section. Fig. 3 is a detached portion of the axle, showing the under side and the adjustable brace of the foot-rack or device; and Fig. 4, a detached portion of the axle with the arm, showing the front and the device for raising such axle.

Like letters refer to similar parts in all of the figures.

The nature of my invention consists in attaching iron arms to the axle, so as to adjust the height of the rake, and in making the foot-rack adjustable by means of braces provided with a series of holes, so that a mounted rake can be operated by any person.

To enable others skilled in the art to make and use my invention, I will proceed to describe its construction and operation.

My rake is mounted upon ordinary wheels by the axle A and wheels B. To the axle A, I attach cast-iron arms G or similar ones made of suitable materials. These arms are provided with flanges or projections by which I attach them to the axle A by means of the holes and bolts $i\ i$. By means of this projection, and the holes $i\ i$, I am enabled to raise or lower the rake to accommodate it to the service required and adjust it to the size of the wheels. In the form shown one of the bolts is formed by using the end of a rake-tooth. This, of course, in a full-sized rake would not do, as a large bolt must be used in place of it. The axle A is about eight feet in length, and the teeth are inserted directly into it and held by the nuts $f\ f$. Where each tooth, $d$, is inserted into the axle I make a cavity, $h$, circular at the bottom and fitted to the coil $c$ of the rake-tooth, and by this means not only strengthen the rake-teeth but greatly improve their action, as the teeth are strengthened in their weakest point and supported, and are also prevented from turning or getting out of place. The thills D are attached to the axle by the metallic straps I, Figs. 3 and 4, and have the usual cross-bars, as shown. To these cross-bars I attach the bar K, which supports the driver's seat C.

The rake is operated for the purpose of raking and discharging by means of the foot-rack F F and $a$ and a treadle, E. The parts of the foot-rack F F are attached to the axle near the thills D, and are connected by the rod $a$, so that the rake can be raised by the application of either or both feet. The parts F F are pivoted at $l\ l$ either by a joint or a slot for the working of the bolt at $l$, and are supported by the braces H, which are securely attached to the axle and are bolted to the parts F. At this end of the braces I insert the number of holes $g\ g$, Fig. 3, so that the foot-rack can be raised or lowered by their use to suit the size of the operator or the pitch of the rake. The treadle E is pivoted to the seat-bar K at $k$, and is used for the purpose of making the teeth press the ground harder than they naturally would, which in some cases is necessary. It is attached to the rod $a$ by means of the wide staple or a slot.

When complete in all of its parts this makes a sulky horse-rake which is simple in construction, easy in operation, and of sufficient strength to make it durable.

What I claim as my invention, and desire to secure by Letters Patent, is—

1. The arms G of the axle, when provided with a projection and holes $i\ i$ for raising or lowering the axle.

2. The foot-rack F F and $a$, when supported by braces provided with holes for raising or lowering it.

3. The combination of the foot-rack F F, braces H H, and treadle E with the axle A, all being arranged, constructed, and combined substantially as set forth.

JOHN LACEY.

Witnesses:
L. L. BOND,
GEORGE W. GRAY.